United States Patent [19]

Genise

[11] Patent Number: 5,904,068
[45] Date of Patent: May 18, 1999

[54] SEMI-AUTOMATIC SHIFT IMPLEMENTATION WITH SYNCHRONIZED TRANSMISSION EMULATION

[75] Inventor: Thomas A. Genise, Dearborn, Mich.

[73] Assignee: Eaton Corporation, Cleveland, Ohio

[21] Appl. No.: 08/822,668

[22] Filed: Mar. 24, 1997

Related U.S. Application Data

[63] Continuation-in-part of application No. 08/649,829, Apr. 30, 1996, and a continuation-in-part of application No. 08/649,830, Apr. 30, 1996, and a continuation-in-part of application No. 08/649,831, Apr. 30, 1996, abandoned, and a continuation-in-part of application No. 08/649,833, Apr. 30, 1996.

[51] Int. Cl.$^6$ .................................................. B60K 41/08
[52] U.S. Cl. .............................. 74/335; 477/111; 477/124
[58] Field of Search ...................................... 477/111, 107, 477/109, 78, 124; 74/335, 336 R

[56] References Cited

U.S. PATENT DOCUMENTS

| | | | |
|---|---|---|---|
| 4,527,447 | 7/1985 | Richards | 74/866 |
| 4,850,236 | 7/1989 | Braun | 74/337 |
| 5,105,357 | 4/1992 | Steeby | 364/424.1 |
| 5,193,410 | 3/1993 | Stine et al. | 74/336 |
| 5,315,900 | 5/1994 | Teeter | 477/165 |
| 5,390,561 | 2/1995 | Stine | 74/331 |
| 5,413,012 | 5/1995 | Davis | 74/335 |
| 5,425,284 | 6/1995 | Davis | 74/335 |
| 5,435,212 | 7/1995 | Menig | 74/745 |
| 5,569,115 | 10/1996 | Desautels et al. | 477/110 |
| 5,571,059 | 11/1996 | Desautels et al. | 477/111 |
| 5,582,558 | 12/1996 | Palmeri et al. | 477/109 |
| 5,679,093 | 10/1997 | Desautels et al. | 477/109 |
| 5,682,790 | 11/1997 | Genise | 477/111 X |
| 5,735,771 | 4/1998 | Genise | 477/111 |

*Primary Examiner*—Dirk Wright
*Assistant Examiner*—Peter T. Kwon
*Attorney, Agent, or Firm*—Howard D. Gordon

[57] ABSTRACT

A semi-automatic shift implementation system (100) for a manually shifted, output-splitter-type compound transmission (10) having gear ratios selectively engaged and disengaged by jaw clutches (48, 50) selectively positioned by a shift lever (57). The system will sense a main transmission section (12) neutral condition, a master clutch disengaged condition, and a target gear ratio ($GR_T$) and will automatically cause the splitter clutch (80) to disengage until the main section is reengaged and the system engine (102) to achieve or dither about a substantially synchronous speed for engaging the target ratio.

17 Claims, 9 Drawing Sheets

SEMI-AUTOMATIC SHIFT IMPLEMENTATION WITH SYNCHRONIZED TRANSMISSION EMULATION

RELATED APPLICATIONS

This application is related to and is a continuation-in-part of the following copending U.S. patent applications, all assigned to EATON CORPORATION, the assignee of this application:

Ser. No. 08/649,829
Filed Apr. 30, 1996
SYNCHRONIZING AND GEAR ENGAGEMENT SENSING LOGIC FOR
AUTOMATED MECHANICAL TRANSMISSION SYSTEM Ser. No. 08/649,830
Filed Apr. 30, 1996
SEMI-AUTOMATIC SHIFT IMPLEMENTATION Ser. No. 08/649,831
Filed Apr. 30, 1996
SEMI-AUTOMATIC SHIFT IMPLEMENTATION WITH AUTOMATIC SPLITTER SHIFTING, abandoned Ser. No. 08/649,833
Filed Apr. 30, 1996
INTENT-TO-SHIFT SEMI-AUTOMATIC SHIFT IMPLEMENTATION

BACKGROUND OF THE INVENTION

1. Field of the Invention

The present invention relates to a semi-automatic shift implementation control system/method for semi-automatic shifting of a lever-shifted, splitter-type mechanical transmission. More particularly, in a preferred embodiment of the present invention, a splitter or combined splitter-and-range-type compound transmission is provided with a splitter clutch at the output end of the transmission and with controls and actuators for manually performed dynamic forward main section shifting, by lever shifting, without requiring manual throttle manipulation to synchronize for engaging the target gear ratio, as is done for shifting a manual synchronized transmission. In a preferred embodiment, an intent-to-shift sensor is provided, allowing the transmission to be manually shifted without master clutch manipulation, if desired.

2. Description of the Prior Art

Compound mechanical transmissions of the splitter and the combined splitter-and-range type are widely used for heavy-duty vehicles and very well known in the prior art, as may be seen by reference to U.S. Pat. Nos. 4,735,109; 4,754,665; 4,944,197; 5,193,410 and 5,390,561, the disclosures of which are incorporated herein by reference.

Semi-automatic shift implementation systems for compound mechanical transmissions wherein, upon manual shifting into a highest grouping of gear ratios, automatic shifting within only that highest grouping is provided, are known in the prior art and are disclosed in U.S. Pat. Nos. 4,722,248 and 5,038,627, the disclosures of which are incorporated herein by reference. Semi-automatic shift implementation systems for mechanical transmissions wherein the vehicle operator is required to manually cause a torque interruption and/or achieve synchronous conditions are known in the prior art and are disclosed in U.S. Pat. No. 5,053,961, the disclosure of which is incorporated herein by reference.

At least partially automated systems wherein engine fuel control, such as engine dither, is utilized to cause non-torque-lock conditions for shifting into neutral without requiring master clutch manipulation and/or to synchronize for the target gear ratio are known in the prior art and are disclosed in U.S. Pat. Nos. 4,850,236; 5,105,357; 5,569,115; 5,523,477; 5,582,558 and allowed copending application 08/649,833, the disclosures of which are incorporated herein by reference.

U.S. Pat. No. 5,435,212, the disclosure of which is incorporated herein by reference, discloses a semi-automatic shift implementation system which, for each lever position, has automatic splitter shifting, which allows a "(2+1)×(2)×(2)" type compound 10-speed transmission to be driven with the ease of a 5-speed manual transmission.

Fully synchronized manual transmissions are well known and widely utilized for automobile, for light- and medium-duty trucks and, especially in Europe and Asia, for heavy-duty trucks. Examples of such transmissions may be seen by reference to U.S. Pat. Nos. 4,428,469; 4,989,706; 5,588,516; 5,390,561 and 5,267,636, the disclosures of which are incorporated herein by reference.

The above systems, as disclosed, were not totally satisfactory for certain applications, as the operator was possibly required to manipulate the splitter control and/or the throttle and/or master clutch for lever shifts, the systems may be more expensive and/or less reliable than desired and/or require excessive shift effort.

The systems for automatically synchronizing manual lever shifts as illustrated in aforementioned U.S. Pat. Nos. 5,569,115; 5,573,477; 5,582,558 and allowed copending application 08/649,833 may be difficult to utilize for drivers accustomed to driving manual synchronized transmissions, as manually disengaging the master clutch will hinder or prevent proper operation of the systems.

SUMMARY OF THE INVENTION

In accordance with the present invention, many of the features of the prior art are utilized in a novel and non-obvious manner to provide a semiautomatic shift implementation control system/method for a multiple-speed, compound transmission system having an output splitter which retains the efficiencies of a mechanical transmission, will allow such a transmission system to be provided with relatively inexpensive sensors, actuators and controls, will allow the operator to make many of the shift decisions, and will allow the transmission to be shifted with the ease and with the same driving technique of a typical passenger automobile synchronized simple manual transmission.

The foregoing is accomplished in a preferred embodiment by providing a control system/method for a transmission, a splitter-type compound mechanical transmission with the splitter or the combined splitter-range auxiliary section at the output end of the transmission, having relatively simple and inexpensive controls, sensors and actuators wherein forward main section ratio shifts (i.e., lever shifts) are manually implemented in the same manner as shifting a synchronized automotive transmission, without the requirement of manual splitter shift selection and with automatic engine controls to synchronize the engine for the target gear ratio, and dynamic forward splitter-only shifts for each forward main section ratio are automatically implemented or, preferably, fully automatic. Preferably, if a combined splitter-and-range-type compound transmission is to be controlled, range shifting will be automatically selected by shift lever movement, as is known in commercially available "double-H" type controls.

Compound range-type mechanical transmissions using so-called "double-H" type controls wherein a range shift is automatically selected by movement of the shift lever, without requiring the operator to use a button or lever to select a range change, are well known in the prior art, as may be seen by reference to U.S. Pat. Nos. 3,429,202; 4,561,325; 4,455,883; 4,663,725 and 4,944,197, the disclosures of which are incorporated herein by reference.

In preferred embodiments, a display will be utilized to inform the driver of the suggested target ratio and/or of the ratio automatically synchronized for and/or to inform the operator that sufficiently synchronous conditions exist for completion of a shift and/or an intent-to-shift sensor will be utilized to sense when an operator intends to shift from a currently engaged ratio into neutral and then into the target ratio for causing preselection of the required splitter shift and causing the engine to be fueled to relieve or minimize torque-lock conditions, allowing the driver the option to shift without master clutch manipulation.

In another preferred embodiment, a transmission input shaft or inertia brake, operated by the system controller, is provided for increasing the rapidity of upshifts.

Accordingly, it is an object of the present invention to provide a new and improved semi-automatic shift implementation system for a mechanical transmission, preferably a lever-shifted compound transmission, which is relatively simple and inexpensive and allows the transmission to be driven in a manner similar to a simple passenger car synchronized manual transmission.

This and other objects and advantages of the present invention will become apparent from a reading of the following description of the preferred embodiments taken in connection with the attached drawings.

BRIEF DESCRIPTION OF THE DRAWINGS

FIG. 3A is a schematic illustration of the splitter actuator of the transmission of FIG. 3.

DESCRIPTION OF THE PREFERRED EMBODIMENT

Certain terminology will be used in the following description for convenience in reference only and will not be limiting. The words "upwardly," "downwardly," "rightwardly" and "leftwardly" will designate directions in the drawings to which reference is made. The words "forward" and "rearward" will refer, respectively, to the front and rear ends of the transmission as conventionally mounted in a vehicle, being respectively from the left and right sides of the transmission illustrated in FIG. 1. The words "inwardly" and "outwardly" will refer, respectively, to directions toward and away from the geometric center of the device and designated parts thereof. Said terminology will include the words above specifically mentioned, derivatives thereof and words of similar import.

The term "compound transmission" is used to designate a change-speed or change-gear transmission having a main transmission section and an auxiliary drive train unit, such as an auxiliary transmission section, connected in series whereby the selected gear reduction in the main transmission section may be compounded by further selected gear reduction in the auxiliary transmission section. The term "upshift" as used herein shall mean the shifting from a lower speed gear ratio to a higher speed gear ratio, and the term "downshift" as used herein shall mean the shifting from a higher speed gear ratio to a lower speed gear ratio.

Figure 1:
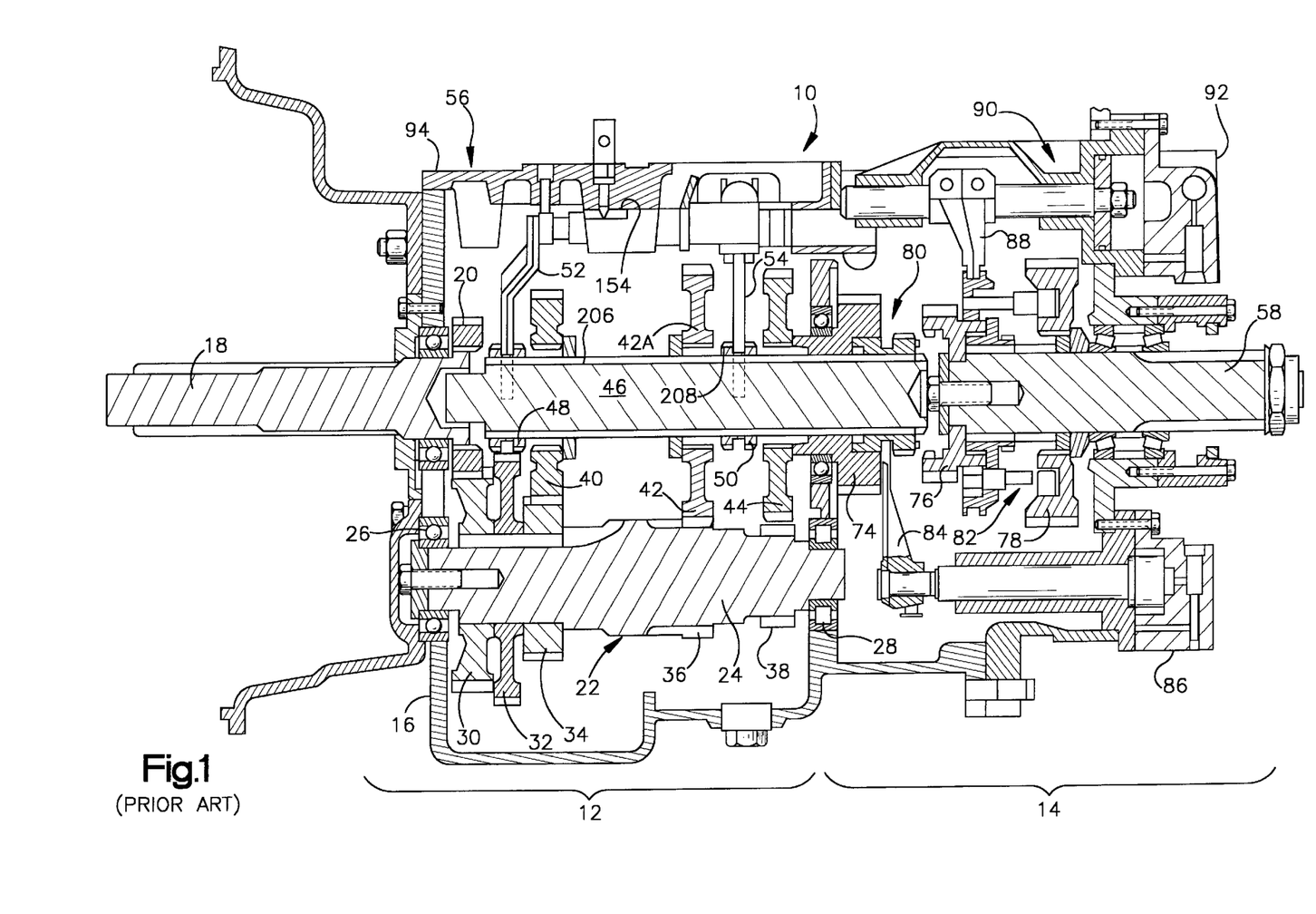
FIG. 1 and 1A are a plan view of a combined range-and-splitter-type compound transmission.
Figure 1A:
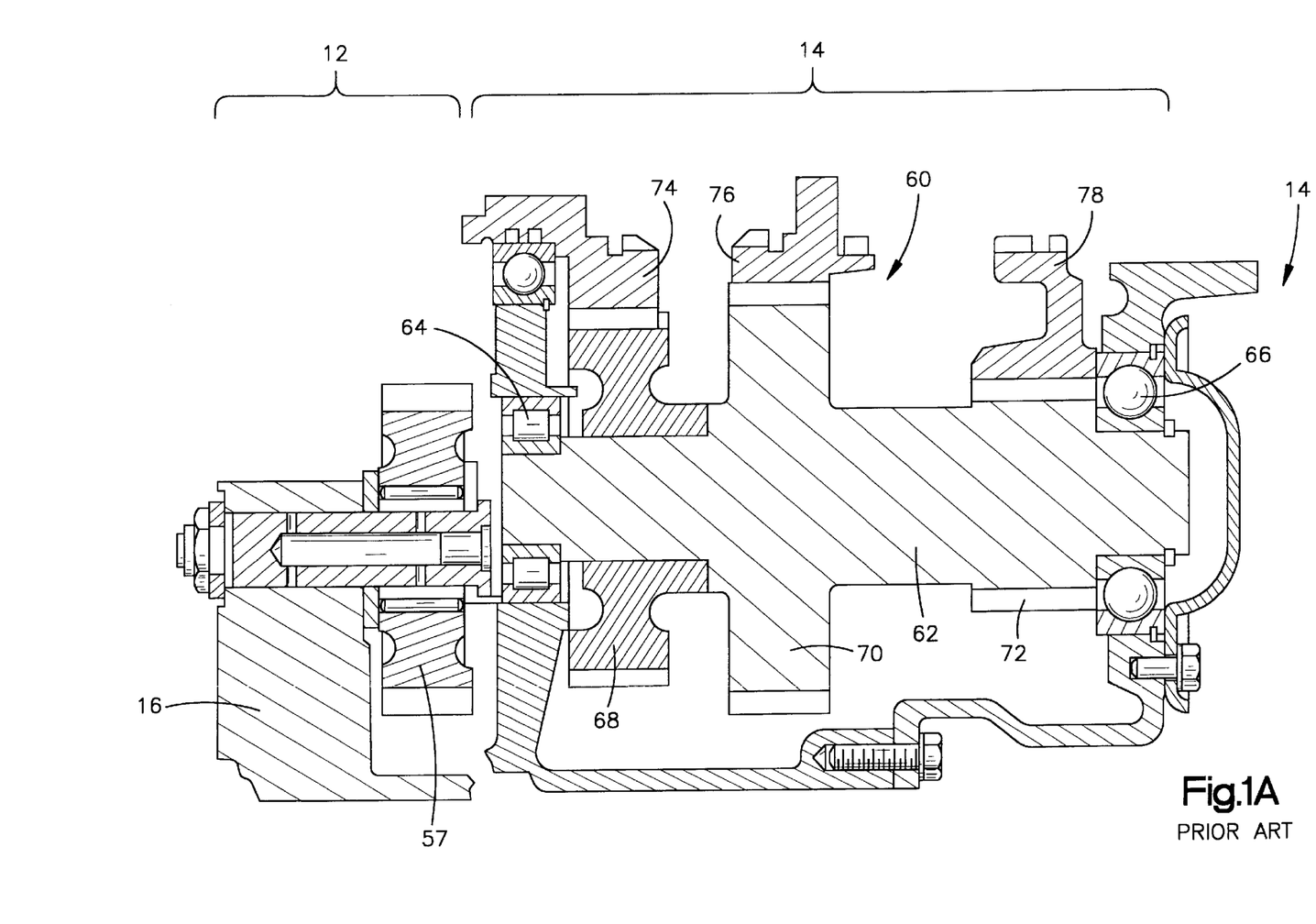

FIGS. 1 and 1A illustrate a combined range-and-splitter-type compound transmission 10 which is especially well suited for control by the semiautomatic shift implementation control system/method of the present invention. Transmission 10 comprises a main transmission section 12 connected in series with an output and auxiliary transmission section 14 having both range- and splitter-type gearing. Typically, transmission 10 is housed within a single multi-piece housing 16 and includes an input shaft 18 driven by a prime mover, such as a diesel engine, through a selectively disengaged, normally engaged, master friction clutch.

In the main transmission section 12, the input shaft 18 carries an input gear 20 for driving at least one countershaft assembly 22. Preferably, as is well known in the prior art and as is illustrated in U.S. Pat. Nos. 3,105,395 and 3,335,616, the disclosures of which are incorporated herein by reference, input gear 20 simultaneously drives a plurality of substantially identical main section countershaft assemblies at substantially identical rotational speeds. Each of the main section countershaft assemblies comprises a main section countershaft 24 supported by bearings 26 and 28 in housing 16 and is provided with main section countershaft gears 30, 32, 34, 36 and 38 fixed thereto. A plurality of main section drive or mainshaft gears 40, 42 and 44 surround the transmission mainshaft 46 and are selectively clutchable, one at a time, to the mainshaft 46 for rotation therewith by sliding clutch collars 48 and 50, as is well known in the art. Clutch collar 48 also may be utilized to clutch input gear 20 to the mainshaft 46 to provide a direct drive relationship between the input shaft 18 and the mainshaft 46. Preferably, each of the main section mainshaft gears encircles the mainshaft 46 and is in continuous meshing engagement with and is floatingly supported by the associated countershaft gear groups, which mounting means and special advantages resulting therefrom are explained in greater detail in aforementioned U.S. Pat. Nos. 3,105,395 and 3,335,616. Typically, clutch collars 48 and 50 are axially positioned by means of shift forks or yokes 52 and 54, respectively, associated with a shift bar housing assembly 56, which may be of the multiple-shift-rail or single-shift-shaft type, as is known in the prior art, and which is manually controlled by a shift lever 57. Clutch collars 48 and 50 are, in the preferred embodiment, of the well-known, non-synchronized, double-acting jaw clutch type.

Main section mainshaft gear 44 is the reverse gear and is in continuous meshing engagement with countershaft gears 38 by means of conventional intermediate idler gears 57 (see FIG. 1A). Main section countershaft gear 32 is provided for powering power takeoff devices and the like. Jaw clutches 48 and 50 are 3-position clutches in that they may be positioned in a centered axially non-displaced, non-engaged position, as illustrated, or in a fully rightwardly engaged or fully leftwardly engaged position.

Auxiliary transmission section 14 is connected in series with main transmission section 12 and is of the 3-layer, 4-speed combined splitter/range type, as illustrated in aforementioned U.S. Pat. Nos. 4,754,665 and 5,390,561. Mainshaft 46 extends into the auxiliary section 14 and is journalled in the inward end of the output shaft 58, which extends from the rearward end of the transmission.

Auxiliary transmission section 14 includes in the preferred embodiment thereof a plurality of substantially identical auxiliary countershaft assemblies 60 (see FIG. 1A), each comprising an auxiliary countershaft 62 supported by bearings 64 and 66 in housing 16 and carrying three auxiliary section countershaft gears 68, 70 and 72 fixed for rotation therewith. Auxiliary countershaft gears 68 are constantly meshed with and support auxiliary section splitter gear 74. Auxiliary countershaft gears 70 are constantly meshed with and support auxiliary section splitter/range gear 76 which surrounds the output shaft 58 at the end thereof adjacent the coaxial inner end of mainshaft 46. Auxiliary section countershaft gears 72 constantly mesh with and support auxiliary section range gear 78, which surrounds the output shaft 58. Accordingly, auxiliary section countershaft gears 68 and splitter gear 74 define a first gear layer, auxiliary section countershaft gears 70 and splitter/range gear 76 define a second gear layer, and auxiliary section countershaft gears 72 and range gear 78 define a third layer, or gear group, of the combined splitter-and-range-type auxiliary transmission section 14.

A sliding double-sided jaw clutch collar 80 is utilized to selectively couple either the splitter gear 74 or the splitter/range gear 76 to the mainshaft 46, while a 2-position synchronized clutch assembly 82 is utilized to selectively couple the splitter/range gear 76 or the range gear 78 to the output shaft 58. The structure and function of double-acting jaw clutch collar 80 is substantially identical to the structure and function of the sliding clutch collars 48 and 50 utilized in the main transmission section 12, and the function of double-acting synchronized clutch assembly 82 is substantially identical to the structure and function of prior art double-acting synchronized clutch assembly, examples of which may be seen by reference to U.S. Pat. Nos. 4,462,489; 4,125,179 and 2,667,955, the disclosures of which are incorporated herein by reference. The illustrated synchronized clutch assembly 82 is of the pin type described in aforementioned U.S. Pat. No. 4,462,489.

The splitter jaw clutch 80 is a 2-sided or double-acting clutch assembly which may be selectively positioned in the rightwardmost or leftwardmost positions for engaging either gear 76 or gear 74, respectively, to the mainshaft 46. In the prior art, the splitter jaw clutch 80 is axially positioned by means of a shift fork 84 controlled by a 2-position piston actuator 86, which is operable by a driver selection switch (such as a button or the like) on the shift knob, as is known in the prior art. Two-position synchronized clutch assembly 82 also is a 2-position clutch which may be selectively positioned in either the rightwardmost or leftwardmost positions thereof for selectively clutching either gear 78 or 76, respectively, to output shaft 58. Clutch assembly 82 is positioned by means of a shift fork 88 operated by means of a 2-position piston device 90, the actuation and control of which will be described in greater detail below.

Figure 2:
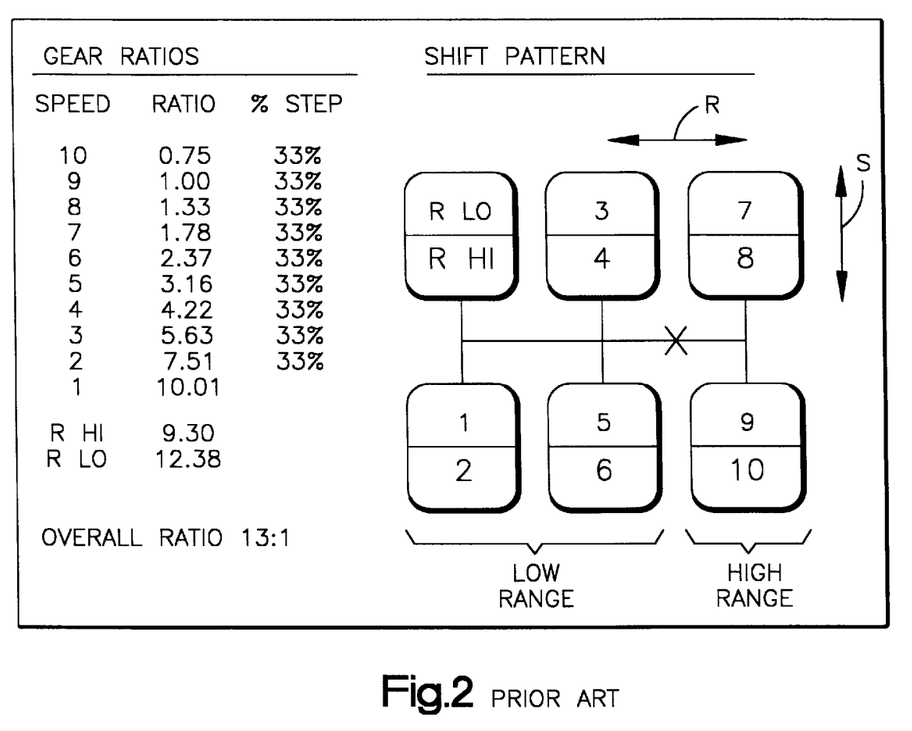
Fig. 2 illustrates a prior art shift pattern for the transmission of FIG. 1.

As may be seen by reference to FIGS. 1–2, by selectively axially positioning both the splitter clutch 80 and the range clutch 82 in the forward and rearward axial positions thereof, four distinct ratios of mainshaft rotation to output shaft rotation may be provided. Accordingly, auxiliary transmission section 14 is a 3-layer auxiliary section of the combined range-and-splitter type providing four selectable speeds or drive ratios between the input (mainshaft 46) and output (output shaft 58) thereof. The main section 12 provides a reverse and three potentially selectable forward speeds. However, one of the selectable main section forward gear ratios, the low speed gear ratios associated with mainshaft gear 42, is not utilized in the high range. Thus, transmission 10 is properly designated as a "(2+1)×(2)×(2)" type transmission providing nine or ten selectable forward speeds, depending upon the desirability and practicality of splitting the low gear ratio. While clutch 82, the range clutch, should be a synchronized clutch, double-acting clutch collar 80, the splitter clutch, is not required to be synchronized.

As splitter clutch 80 is located interposed between the main transmission section 12 and the output, it is considered to be an output splitter.

According to the prior art, as disclosed in aforementioned U.S. Pat. No. 4,944,197, the main section ratios are selected and implemented manually by a shift lever, splitter shifts are manually selected by operation of a manual selector lever or button, often located on the shift lever or built into the shift knob, and are implemented by a remote 2-position actuator. The range shift is manually or automatically selected and implemented by a remote 2-position actuator. A separate range control button/lever may be provided, or as illustrated in FIG. 2, a lever operated "double-H" type control may be utilized. Range and splitter actuators and controls of this type are well known in the prior art, as may be seen by reference to U.S. Pat. No. 4,788,889, the disclosure of which is incorporated herein by reference.

The prior art shift pattern for shifting transmission 10 is schematically illustrated in FIG. 2. Divisions in the vertical direction at each gear lever position signify splitter shifts, while movement in the horizontal direction from the ¾ and ⅚ leg of the "H" pattern to the ⅞ and ⁹⁄₁₀ leg of the "H" pattern signifies a shift from the low range to the high range of the transmission. As discussed above, in the prior art, splitter shifting is accomplished in the usual manner by means of a vehicle operator- actuated splitter button or the like, usually a button located at the shift lever knob. Operation of the range clutch shifting assembly is an automatic response to movement of the gear shift lever between the central and rightwardmost legs of the shift pattern, as illustrated in FIG. 2. Range shift devices of this general type are known in the prior art, as may be seen by reference to aforementioned U.S. Pat. Nos. 3,429,202; 4,455,883; 4,561,325 and 4,663,725.

Referring again to FIG. 2, assuming it is desirable that a transmission have generally equal ratio steps, the main section ratio steps should be generally equal, the splitter step should be generally equal to the square root of the main section ratio steps, and the range step should equal about the main section ratio step raised to the $N^{TH}$ power where N equals the number of main section ratio steps occurring in both ranges (i.e., N=2 in the (2+1)×(2)×(2) transmission 10). Given the desired ideal ratios, gearing to approximate these ratios is selected. In the above example, the splitter steps are about 33.3%, while the range step is about 316%, which is generally suitable for a "2+1" main transmission section having about 78% steps, as the square root of 1.78 equals about 1.33, and 1.78 raised to the second power (i.e., N=2) equals about 3.16.

To accomplish a shifting of the range section of the transmission 10 without requiring the operator to actuate any control device other than the gear lever movements to the rightwardmost leg of the shift pattern as seen in FIG. 2, a range control valve assembly is provided to provide a signal to a slave valve 92, located at piston assembly 90, to shift the shift fork 88.

Figure 3:
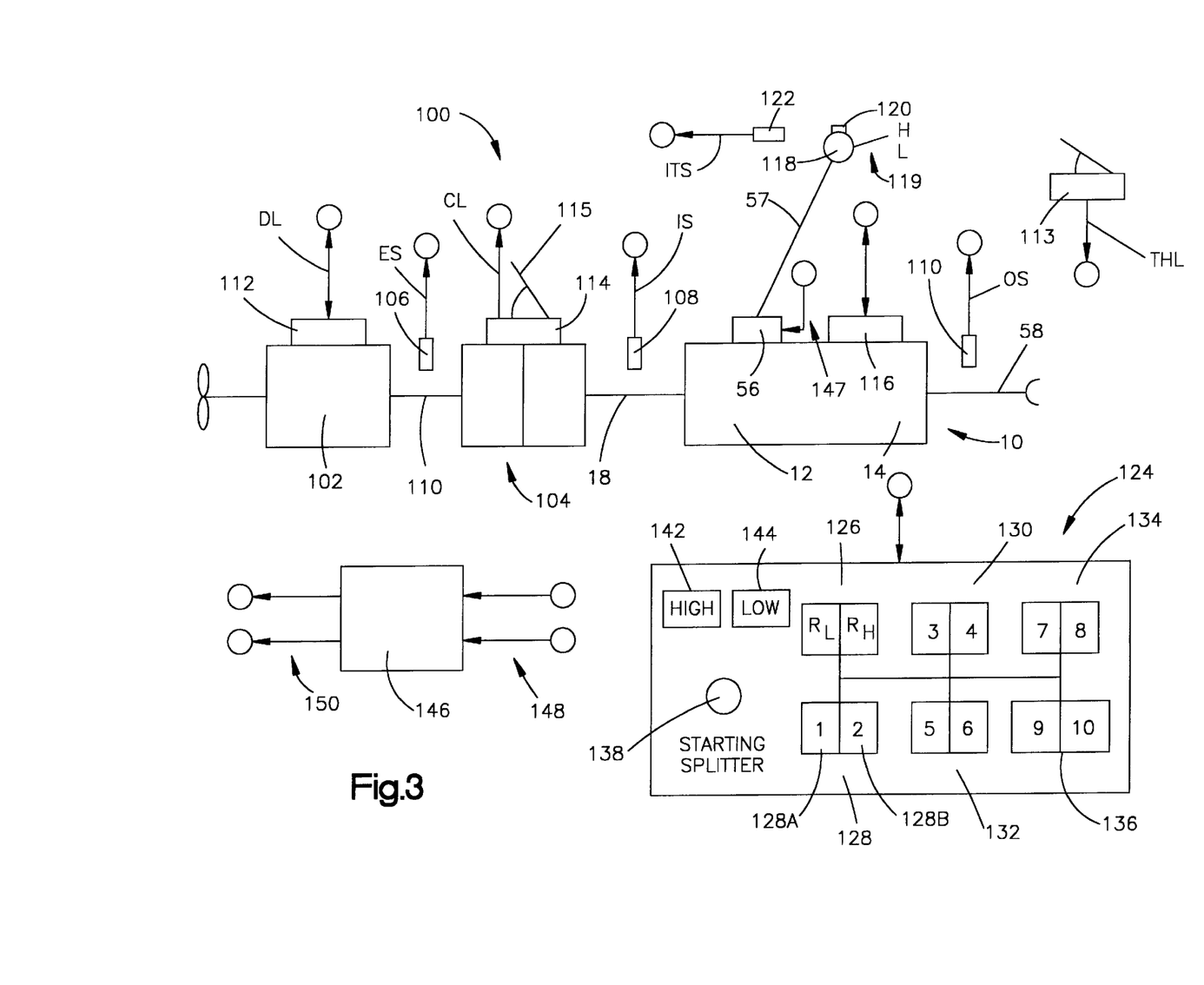
FIG. 3 is a schematic illustration, in block diagram format, of a preferred embodiment of the semi-automated shift implementation transmission system of the present invention.

According to the present invention, at least the forward shifting of transmission 10 is semi-automatically implemented by the vehicular semi-automatic transmission system 100, illustrated in FIG. 3. A compound-type transmission 10 comprising a main section 12 coupled to an auxiliary section 14 controlled by the shift control system/method of the invention, is seen in FIG. 3. Main section 12 includes input shaft 18, which is operatively coupled to the drive or crank shaft of the vehicle engine 102 by manually controlled master clutch 104, and output shaft 58 of auxiliary section 14 is operatively coupled, commonly by means of a drive shaft, to the drive wheels of the vehicle (not shown).

The change-gear ratios available from main transmission section 12 are manually selectable by positioning the shift lever 57 according to the shift pattern prescribed to engage the particular change gear ratio of main section 12 desired. As will be described, manual synchronizing is not required and, as is done for driving an automotive synchronized transmission, the master clutch may be disengaged during shifting. Preferably, the system will include means to sense an intent to shift and will automatically take actions to minimize or relieve torque-lock conditions, which will allow shifting without requiring master clutch disengagement, allowing an easier shift into main section neutral from the engaged main section ratio and further allowing required splitter shifts to be preselected for rapid completion upon a torque break and shift into neutral.

The system 100 includes sensors 106 for sensing engine rotational speed (ES), 108 for sensing input shaft rotational speed (IS), and 110 for sensing output shaft rotational speed (OS) and providing signals indicative thereof. Engine 102 may be electronically controlled, including an electronic controller 112 communicating over an electronic data link (DL) operating under an industry standard protocol such as SAE J-1922, SAE J-1939, ISO 11898 or the like. If such a data link is present, sensors such as engine speed sensor 106 may be eliminated, as engine speed and other control parameters are typically available on such data links. Throttle position (driver demand) is a desirable parameter for selecting shifting points and in other control logic. A separate throttle position sensor 113 may be provided or throttle position (THL) may be sensed from the data link.

A manual clutch pedal 115 controls the master clutch, and a sensor 114 provides a signal (CL) indicative of clutch-engaged or disengaged condition. The condition of the clutch also may be determined by comparing engine speed to input shaft speed. A splitter actuator 116 is provided for operating the splitter clutch 82 in accordance with command output signals. The shift lever 57 has a knob 118 which contains sensing means or a button 120 by which a driver's intent to shift may be sensed. Sensor 122 provides a signal (ITS) indicative of the sensed presence or absence of the driver's intent to shift into neutral. Various other sensors sensing movement of the shift lever may be utilized, as may be seen by reference to SAE Paper No. 840307 and/or U.S. Pat. Nos. 5,569,115 and 5,573,477, the disclosures of which are incorporated herein by reference. A manual switch 119 for selecting a splitter shift also may be provided.

A driver's control display unit 124 includes a graphic representation of the six-position shift pattern with individually lightable buttons or other display elements 126, 128, 130, 132, 134 and 136 representing each of the selectable engagement positions. The unit also includes a button 138 connected to toggle-type controls for selecting the high or low splitter range for start-from-stop splitter position selection. The selection will be indicated by lights 142 or 144.

In the preferred embodiment, individually lightable buttons or members will be provided for each ratio, as shown by elements 128A and 128B, for ratios "1" and "2", respectively.

The system includes a control unit 146, preferably a microprocessor-based control unit of the type illustrated in U.S. Pat. Nos. 4,595,986; 4,361,065 and 5,335,566, the disclosures of which are incorporated herein by reference, for receiving input signals and processing same according to predetermined logic rules to issue command output signals 150 to system actuators, such as the splitter section actuator 116, the engine controller 112 and the display unit 124. A separate system controller 146 may be provided, or the engine controller 112 communicating over an electronic data link may be utilized.

The splitter actuator 116, as shown in allowed, copending patent application U.S. Ser. No. 08/597,304, the disclosure of which is incorporated herein by reference, is a 3-position device, allowing a selectable and maintainable splitter section neutral, see FIG. 3A. The actuator is responsive to signals from controller 146, and splitter neutral is selectable only by the controller 146 and not by selector 119, if utilized. Other 3-position actuators also may be utilized.

Forward dynamic splitter-only shifts, such as third-to-fourth and fourth-to-third shifts, are automatically implemented without driver intervention. By way of example, assuming a 3-position splitter actuator, upon sensing that a splitter shift is required, the ECU 146 will issue commands to the actuator 116 to bias the actuator toward neutral, and to engine controller 112 to minimize or break torque. As soon as splitter neutral is sensed, the engine will be commanded to a synchronous engine speed for the target gear ratio at current output shaft speed ($ES=IS=OS*GR_T \pm E_{RROR}$). The engagement is timed, in view of reaction times and shaft speeds and accelerations, to occur just off synchronous to prevent clutch butting. Automatic splitter shifting of this type is illustrated in aforementioned U.S. Pat. Nos. 4,722,248 and 5,435,212. Alternatively, splitter shifting may be automatically implemented in response to driver manipulation of selector 119.

The engaged and neutral (not engaged) conditions of transmission 10 may be sensed by comparing the input shaft/output shaft rotational speeds to known gear ratios ($IS/OS=GR_{i-1\ to\ 10} \pm Y$?) for a period of time. Position sensors may be utilized in lieu of or in addition to input shaft and output shaft speed logic. A main section neutral sensor 147 is provided to sense the neutral/not-neutral condition of main transmission section 12.

When synchronizing to engage a target ratio, the engine is directed to achieve and remain at a speed about 30 to 100 RPM (preferably about 60 RPM) above or below (preferably below) true synchronous speed ($ES_{SYNCHRO}=(OS \times GR_T)-45$ RPM) to achieve a good quality jaw clutch engagement without butting. To verify engagement of a target ratio, the system looks for input shaft speed equaling the product of output shaft speed and the numerical value of the target ratio, plus or minus about 10 to 30 RPM ($IS=(OS*GR_T) \pm 20$ RPM) for a period of time, about 100 to 400 milliseconds.

The foregoing logic allows transmission engaged and neutral conditions to be determined on the basis of input and output shaft speeds without false engagement sensing caused by engine synchronizing for engagement of a target ratio.

Figure 4:
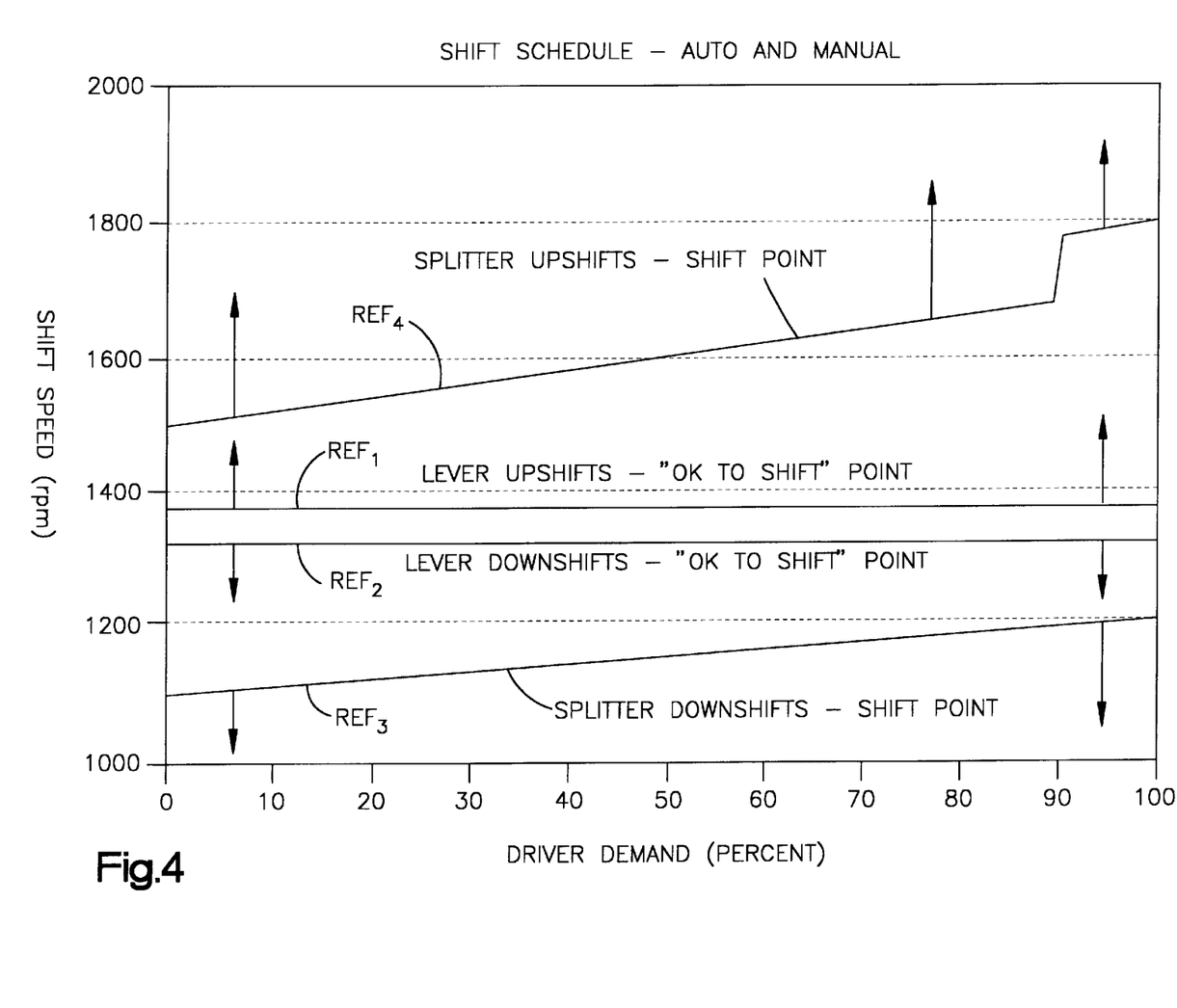
FIG. 4 is a graph illustrating the shift point logic of the control system method of the present invention.

When in an even numbered ratio (i.e., when in the high splitter ratio) and above a given engine speed/input shaft speed (for example, about 1,375 RPM for a diesel engine governed to about 2,100 RPM), a lever upshift (with an automatic splitter downshift) is appropriate and the system, if requested by the driver, will semi-automatically implement same. Similarly, when in an odd numbered ratio (i.e., when in the low splitter ratio) and below a given engine speed (for example, about 1,350 RPM for the same engine), a lever downshift (with an automatic splitter upshift) is appropriate and the system, if requested by the driver, will semi-automatically implement same. FIG. 4 illustrates the automatic splitter shift points and the appropriate lever shift points. It is noted that splitter-only shifts (such as 3-4 and 4-3 shifts) are preferably automatically implemented, while lever shifts, with accompanying splitter shifts, require driver initiation and main section jaw clutch manipulation.

The display unit 124 will inform the driver of the currently engaged ratio lever position and the lever position of the currently appropriate lever shift, if any. In one embodiment, the lever position of the currently engaged ratio will be indicated by a steadily lighted button, while the lever position of the appropriate lever shift will be indicated by a flashing button.

Assuming fourth gear is engaged and input shaft speed is 1,525 RPM, the ¾ button 130 will be steadily lit, indicating that third or fourth gear is engaged and, as an upshift into fifth is appropriate, the ⅚ button 132 will flash. The driver may choose to remain in fourth or decide that a shift into fifth is desirable.

Figure 5A:
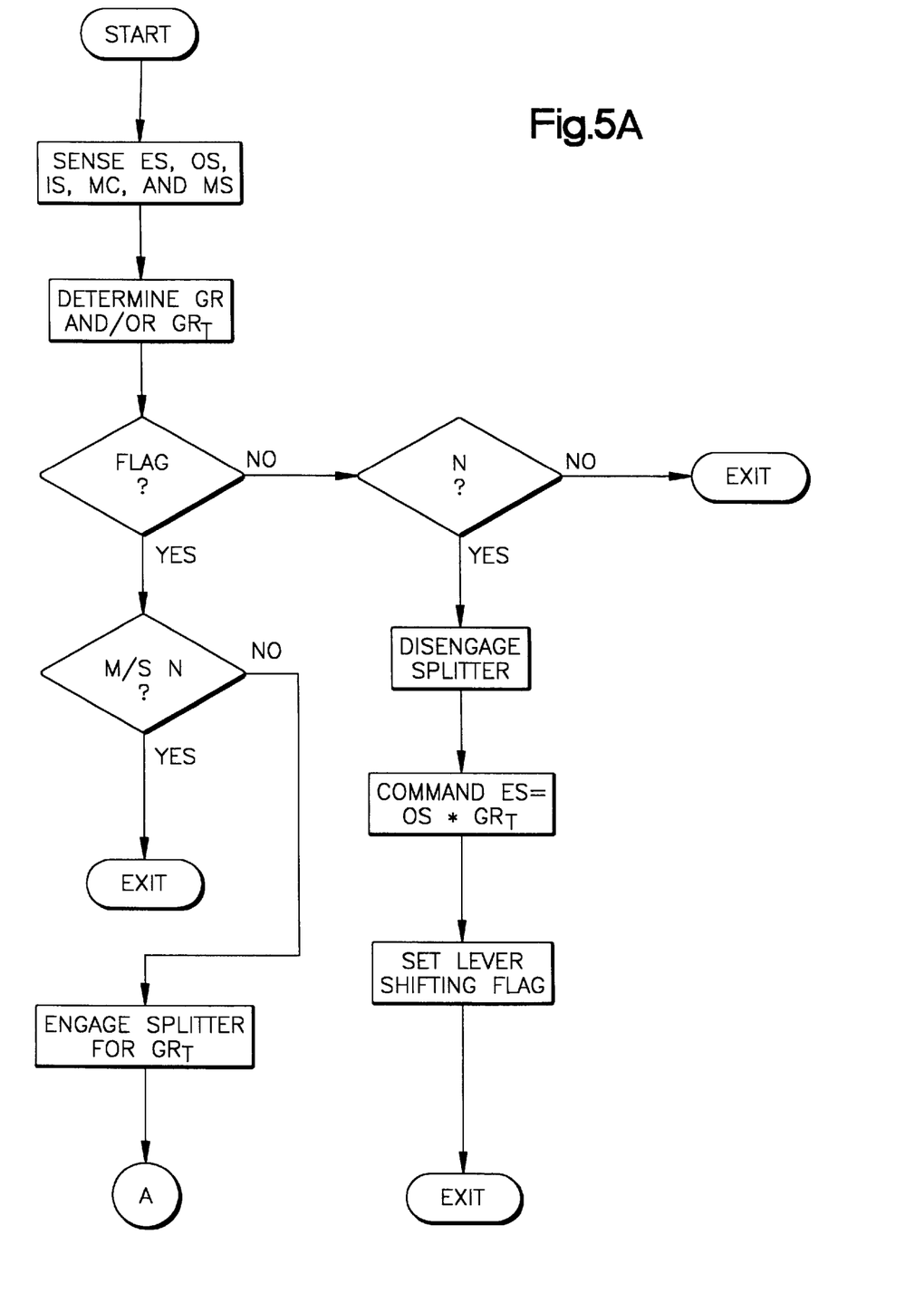
FIGS. 5A–5B are schematic illustrations, in flow chart format, of a preferred embodiment of the present invention.
Figure 5B:
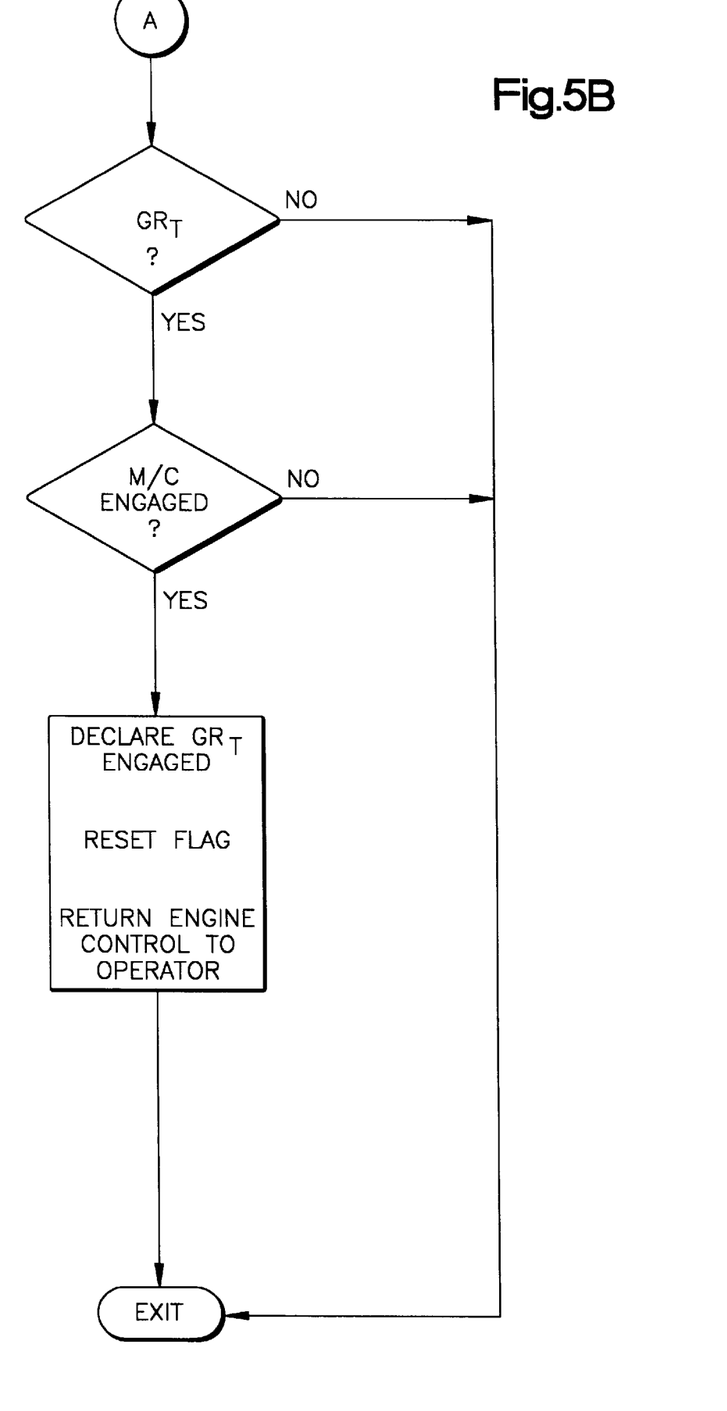

In one preferred embodiment, schematically illustrated in FIGS. 5A and 5B, the transmission may be shifted in the manner of a familiar automotive manual synchronized transmission wherein the master clutch 104 is manually disengaged during the shift procedure.

The master clutch is disengaged, allowing the operator to manually shift lever 57 to a neutral position. Upon sensing a shift of the main section to neutral, the controller 146 will command the splitter actuator 116 to a splitter neutral position and will command the engine controller to assume or to dither about synchronous speed for engagement of the target gear ratio ($GR_T$), in this example fifth, at current output shaft speed ($ES=OS*GR_T$). As the main section 12 and the splitter clutch 80 are both disengaged, main shaft 46 is at a very low inertia and easily engaged in any forward ratio, regardless of speed differences across the engaging jaw clutch members.

When engagement of the main section is sensed, such as by position sensor 147, the splitter actuator is commanded to engage the appropriate splitter ratio (low for fifth) which will be easily accomplished, as the master clutch will be disengaged or, if engaged, will cause the input shaft and all gears driven thereby to be at or to dither about synchronous speed as the engine speed is at $ES=OS*GR_T$. Thereafter, as soon as the operator reengages the master clutch, control of engine fueling will be returned to the operator.

Preferably, the transmission also may be shifted without master clutch manipulation.

If the driver moves the lever to neutral and neutral is confirmed with the master clutch engaged, the ¾ button will be extinguished, while the controller 146 issues commands to the engine controller to cause the engine and input shaft speeds to approach the synchronous values therefor, when the appropriate splitter shift is completed (in this example, a splitter shift from splitter-high to splitter-low). Upon confirmation that synchronous conditions exist, the operator may shift easily into the ⅚ lever position without the use of the clutch. Upon confirmation that fifth is engaged, the ⅚ button 132 will be lit in a steady manner.

Preferably, the shift knob 118 will include a sensor or an intent-to-shift button 120 by which the driver will indicate that he intends to initiate a lever shift sequence. Upon receiving the intent-to-shift signal (ITS), the controller 146 will issue commands to the engine controller 112 to relieve torque lock by fuel manipulations and to auxiliary section actuator 116 to preselect the required splitter shift. This will allow easy shifting from the engaged ratio (fourth) into neutral without operator throttle manipulation or clutch disengagement, as well as providing a rapid splitter shift. Engine manipulations to relieve torque lock without requiring clutch disengagement is described in greater detail in aforementioned U.S. Pats. Nos. 4,850,236 and 5,105,357. Preferably, if no lower shift is then appropriate, the intent-to-shift signal will not be acted upon.

When in neutral, the operator normally will develop a rhythm of when to shift into the target ratio. Alternatively, the system may inform the operator of when the engine speed is at or is approaching synchronous sufficiently to allow the lever to be moved into the target lever position. This may be by an audible alarm, a separate "okay-to-shift" light and/or simply changing the frequency of flashing the target lever position button. Alternatively, as shown in U.S. Pat. No. 4,023,443, the disclosure of which is incorporated herein by reference, informing the operator may comprise preventing or inhibiting shifting until properly synchronous conditions exist. Also, instead of lighting an entire position button, such as the ¾ lever position button 130, individually controlled, lighted buttons or the like may be provided for each ratio (i.e., a separately controlled display element for each of the two reverse and ten forward-speed ratios).

Output speed (OS) is constantly monitored and, if speed changes cause a change in appropriate or "best gear" during a shift sequence, a new "best gear" will be indicated by a flashing button and will be synchronized for.

In the absence of an intent-to-shift sensor, to accomplish a lever shift (such as a fourth-to-fifth shift), under many operating conditions, the shift to neutral will require operator manipulation of the throttle and/or master clutch.

Figure 6A:
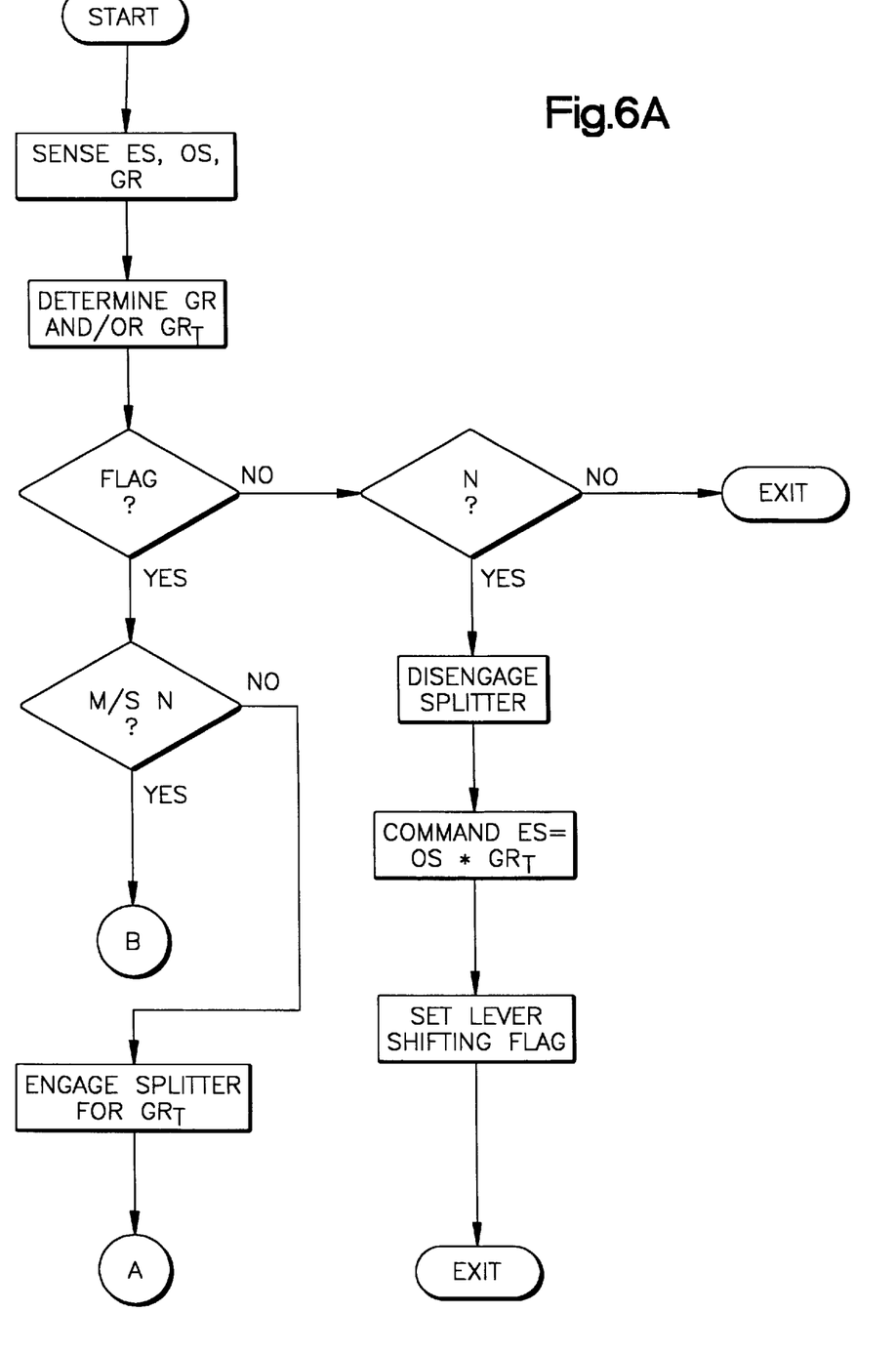
FIGS. 6A–6B are schematic illustrations, in flow chart format, of an alternate embodiment of the present invention.
Figure 6B:
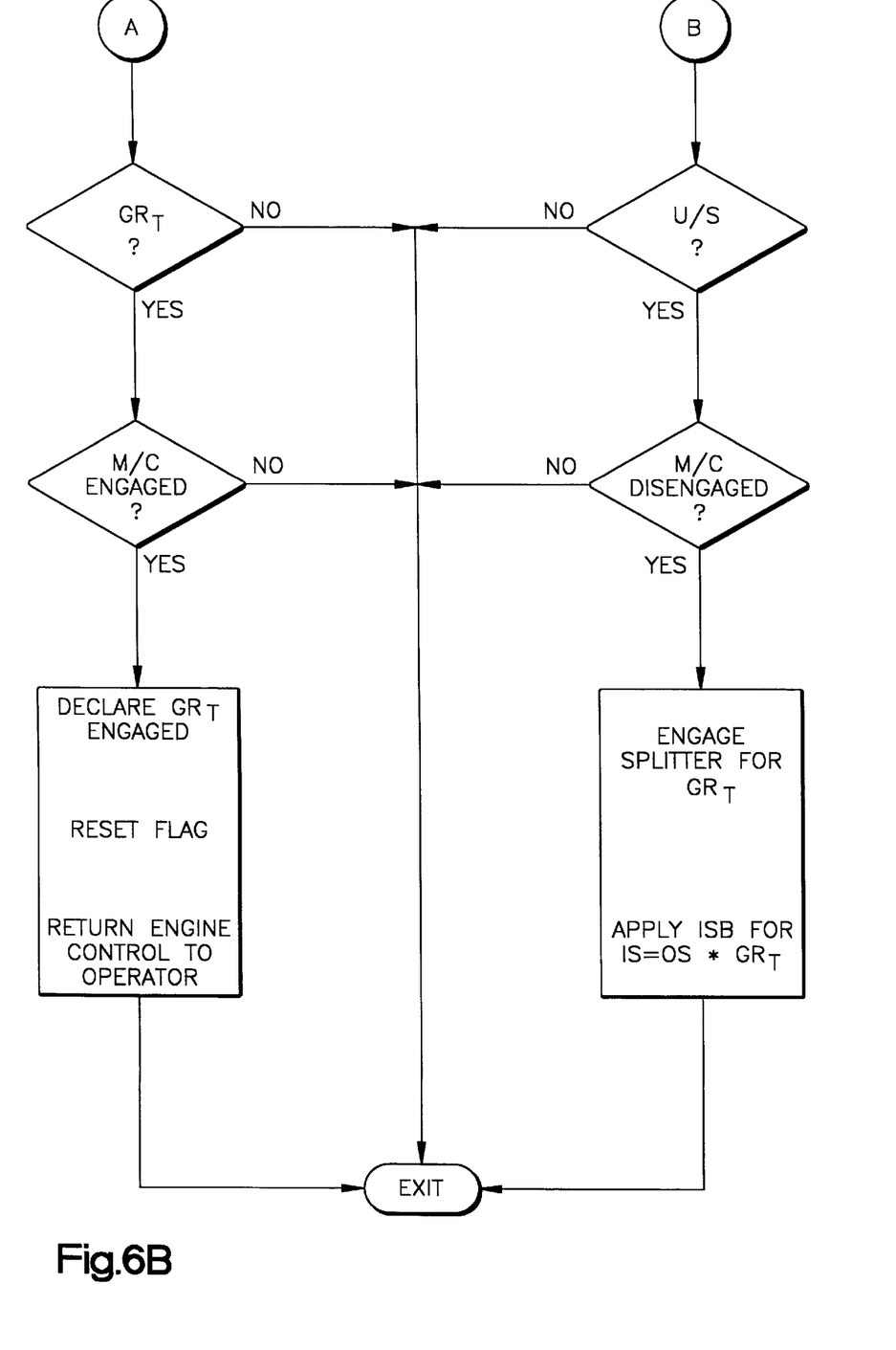

In an alternate preferred embodiment of the present invention, schematically illustrated in FIGS. 6A and 6B, the transmission 10 is provided with an input shaft brake 13, also commonly called an inertia brake, actuated by the controller 146. The input shaft brake 13 is utilized, as is well known, to rapidly decelerate the input shaft 18 and associated gearing for more rapid upshifting.

This embodiment differs from the embodiment of FIGS. 5A and 5B only during a lever upshift into a target gear ratio. During a lever upshift, if the main section 12 and the master clutch 104 both are disengaged, then in addition to commanding engine speed to a synchronous speed for the target ratio, the splitter clutch is engaged in appropriate splitter ratio for the target gear ratio and the input shaft brake is applied to cause input shaft speed to equal a substantially synchronous speed ($IS=OS*GR_T$). With the master clutch and the main section disengaged, the input shaft, associated gearing (shafts 24 and gears 30, 32, 34, 36, 38, 20, 40, 42 and 44) and master clutch plate(s) are at a relatively low inertia and will decelerate quickly under the action of the inertia brake. It has been observed that a most rapid lever shift from neutral will require at least about 80 milliseconds, which is longer than required to bring the input shaft to about synchronous speed for engaging an upshift target gear ratio under the action of properly sized input shaft brake. Other than engaging the splitter and activating the input shaft brake 13 during a lever upshift, the control system/method of FIGS. 6A–6B is substantially identical to that of FIGS. 5A–5B described above.

While many of the features of the control system/method of the present invention are applicable to many types of transmissions, the present invention is especially well suited to a splitter-type transmission or a combined splitter-and-range-type transmission with an automatic range shifting feature (see U.S. Pat. No. 5,000,060, the disclosure of which is incorporated herein by reference), as these types of transmissions utilize a minimal number of lever shifts for a given number of forward ratios.

It is also noted that in the event of a complete or partial failure of system 100, transmission 10 will have a limp-home mode of operation, allowing engagement of two, three or five wide ratio step forward speeds.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A manually shifted vehicular transmission system comprising a splitter-type compound transmission (10) having a main transmission section (12) and an output splitter-type auxiliary transmission section (14) connected in series therewith, said main transmission section having an input shaft driven by a fuel-controlled engine through a manually controlled master clutch (104), a plurality of selectably engageable and disengageable drive ratios, and a selectable neutral, all of said drive ratios and neutral selected by means of selectively engaged and disengaged jaw clutches operatively positioned by a manually operated shift lever having a plurality of shift lever positions; said auxiliary transmission section having a splitter clutch selectively positioned by a 3-position splitter actuator to a first position for engaging a first splitter ratio, a second position for engaging a second splitter ratio, and a third position for disengaging said main transmission section from an output shaft (58);

means to determine a forward target gear ratio;

means to sense a main transmission section neutral condition; and means to automatically control shifting of said auxiliary section, said means effective, upon sensing determination of a forward target gear ratio and a main transmission section neutral condition, to cause said splitter actuator to position said splitter clutch in the third position thereof and, upon then sensing a main transmission section not-neutral condition, to cause said splitter actuator to position said splitter clutch in one of the first and second positions thereof for engaging the splitter ratio required for engaging said target gear ratio.

2. The system of claim 1 further comprising means for sensing master clutch condition and means to automatically control fueling of the engine, said means effective, upon sensing main transmission section neutral, after determination of a target gear ratio, to cause the engine to achieve a substantially synchronous speed for engaging said target gear ratio and effective, upon then sensing main transmission section not-neutral and master clutch engaged conditions, to cause the engine to be fueled as requested by the operator.

3. The system of claim 2 further comprising an input shaft retarding device (13) and means effective upon (i) determining that a shift into said target gear ratio is an upshift, (ii) a main transmission section neutral condition, and (iii) a master clutch disengaged condition for causing said splitter clutch to be engaged in the splitter ratio appropriate for engaging said target gear ratio and applying said retarding device to decelerate said input shaft to a substantially synchronous speed for engaging said target gear ratio.

4. The system of claim 1 wherein said auxiliary section is a combined range-and-splitter-type auxiliary section.

5. The system of claim 2 wherein said auxiliary section is a combined range-and-splitter-type auxiliary section.

6. The system of claim 3 wherein said auxiliary section is a combined range-and-splitter-type auxiliary section.

7. The transmission system of claim 1 further comprising means to automatically initiate and complete all dynamic forward splitter shifts.

8. The transmission system of claim 2 further comprising means to automatically initiate and complete all dynamic forward splitter shifts.

9. The transmission system of claim 3 further comprising means to automatically initiate and complete all dynamic forward splitter shifts.

10. The system of claim 1 further comprising sensors for providing input signals indicative of input shaft speed and output shaft speed, said means to determine a target gear ratio and to determine engagement of said target ratio, making such determinations as a function of said speed signals.

11. The system of claim 1 further comprising sensors for providing input signals indicative of engine speed and input shaft speed, said means to sense a non-engaged condition of said friction clutch making such determination as a function of said speed signals.

12. The system of claim 1 further comprising a display for indicating at least one of the current shift lever position and the shift lever position of the target gear ratio.

13. The system of claim 2 further comprising a display for indicating at least one of the current shift lever position and the shift lever position of the target gear ratio.

14. The system of claim 3 further comprising a display for indicating at least one of the current shift lever position and the shift lever position of the target gear ratio.

15. The control system of claim 1 wherein said engine includes a microprocessor-based engine controller mounted to said engine and having a memory, said means to sense transmission neutral, determine a target gear ratio and automatically control fueling comprising logic rules stored in said memory.

16. The control system of claim 2 wherein said engine includes a microprocessor-based engine controller mounted to said engine and having a memory, said means to sense transmission neutral, determine a target gear ratio and automatically control fueling comprising logic rules stored in said memory.

17. The control system of claim 3 wherein said engine includes a microprocessor-based engine controller mounted to said engine and having a memory, said means to sense transmission neutral, determine a target gear ratio and automatically control fueling comprising logic rules stored in said memory.

* * * * *